US005485724A

United States Patent [19]

Nozawa et al.

[11] Patent Number: 5,485,724

[45] Date of Patent: Jan. 23, 1996

[54] HYDRAULIC DRIVE SYSTEM

[75] Inventors: Yusaku Nozawa; Wataru Ohtsu; Nobuhiko Ichiki, all of Ibaraki; Kazuyuki Ino, Shimodate; Hiroshi Matsuzaki, Tsukuba; Kinya Takahashi, Tsuchiura, all of Japan

[73] Assignee: Hitachi Construction Machinery Co., Ltd., Tokyo, Japan

[21] Appl. No.: 162,142

[22] PCT Filed: May 21, 1993

[86] PCT No.: PCT/JP93/00677

§ 371 Date: Dec. 14, 1993

§ 102(e) Date: Dec. 14, 1993

[87] PCT Pub. No.: WO93/24757

PCT Pub. Date: Dec. 9, 1993

[30] Foreign Application Priority Data

May 22, 1992 [JP] Japan .................................... 4-130938

[51] Int. Cl.[6] .................................................. F16D 31/02

[52] U.S. Cl. ..................................... 60/421; 60/452; 71/6

[58] Field of Search ............................ 60/421, 452, 486; 91/6, 532

[56] References Cited

U.S. PATENT DOCUMENTS

| | | | |
|---|---|---|---|
| 4,087,968 | 5/1978 | Bianchetta . | |
| 4,367,624 | 1/1983 | Ogata et al. | 60/486 |
| 4,425,759 | 1/1984 | Krusche | 60/452 |
| 4,759,183 | 7/1988 | Kreth et al. | 60/486 |

FOREIGN PATENT DOCUMENTS

| | | |
|---|---|---|
| 235545 | 9/1987 | European Pat. Off. . |
| 2-248705 | 10/1990 | Japan . |
| 4-19412 | 1/1992 | Japan . |

*Primary Examiner*—F. Daniel Lopez
*Attorney, Agent, or Firm*—Fay, Sharpe, Beall, Fagan, Minnich & McKee

[57] ABSTRACT

A hydraulic drive system comprises a check valve cb1 for detecting a pressure on the outlet side of a pressure compensating device VB1, a maximum load pressure detecting line SL1 for selecting higher one of the pressure detected by the check valve cb1 and a load pressure of an actuator associated with a hydraulic pump P1 and supplying it as a signal pressure, a check valve cb2 for detecting a pressure on the outlet side of a pressure compensating device VB2, a maximum load pressure detecting line SL2 for selecting higher one of the pressure detected by the check valve cb2 and a load pressure of an actuator associated with a hydraulic pump P2 and supplying it as a signal pressure independently of the maximum load pressure detecting line SL1, and a passage 300 for joining hydraulic fluids supplied from the hydraulic pumps P1, P2 and passing through variable restrictors RB1, RB2 with each other and supplying it to an actuator B. Mutual independence between the two hydraulic pumps P1, P2 can be thereby ensured.

5 Claims, 5 Drawing Sheets

HYDRAULIC DRIVE SYSTEM

TECHNICAL FIELD

The present invention relates to a hydraulic drive system equipped on civil engineering and construction machines such as hydraulic excavators, and more particularly to a hydraulic drive system comprising a plurality of variable restrictors for controlling respective flow rates supplied to a plurality of actuators and a plurality of pressure compensating valves for controlling respective differential pressures across the plurality of variable restrictors, maximum one of load pressures of the plural actuators being selected as a maximum load pressure and applied as a signal pressure to a regulator for a variable displacement hydraulic pump.

BACKGROUND ART

As civil engineering and construction machines, e.g., hydraulic excavators, there is known the type of machine that includes a plurality of actuators such as a boom cylinder, an arm cylinder, a bucket cylinder, a travel motor and a swing motor, and a hydraulic drive system for supplying a hydraulic fluid to those actuators includes a plurality of variable restrictors in communication with a delivery line of a hydraulic pump, the variable restrictors being operated to supply the hydraulic fluid to the corresponding actuators. However, with operation of such a hydraulic drive system there is a fear that when plural variable restrictors are operated simultaneously, the hydraulic fluid is supplied to the actuator having a small load pressure, but not supplied to the actuator having a large load pressure.

For that reason, there has been proposed a hydraulic drive system as disclosed in JP, A, 2-248705. This prior-art system comprises first and second variable displacement hydraulic pumps, a first hydraulic actuator driven by hydraulic fluids delivered from the first and second hydraulic pumps, a second hydraulic actuator driven by the hydraulic fluid delivered from the second hydraulic pump, a first variable restrictor for controlling a flow rate of the hydraulic fluid supplied from the first hydraulic pump to the first hydraulic actuator, a second variable restrictor for controlling a flow rate of the hydraulic fluid supplied from the second hydraulic pump to the first hydraulic actuator, a third variable restrictor for controlling a flow rate of the hydraulic fluid supplied from the second hydraulic pump to the second hydraulic actuator, a first pressure compensating device for controlling a differential pressure across the first variable restrictor, a second pressure compensating device for controlling a differential pressure across the second variable restrictor, a third pressure compensating device for controlling a differential pressure across the third variable restrictor, a first regulator for controlling a delivery rate of the first hydraulic pump, a second regulator for controlling a delivery rate of the second hydraulic pump, and a coupling circuit for joining the flow rate passing through the first variable restrictor and the flow rate passing through the second variable restrictor with each other and supplying the joined flow rate to the first hydraulic actuator.

The above prior-art system further comprises a first check valve for detecting a pressure on the outlet side of the first pressure compensating device, a second check valve for detecting a pressure on the outlet side of the second pressure compensating device, a third check valve for detecting a pressure on the outlet side of the third pressure compensating device, and a signal pressure supply circuit for selecting maximum one of the pressure detected by the first check valve, the pressure detected by the second check valve and the pressure detected by the third check valve, and supplying the selected maximum pressure as a common signal pressure to the first and second regulators.

The first and second variable restrictors, the first and second pressure compensating devices, and the first and second check valves constitute one valve apparatus. Also, the first and second variable restrictors are formed in a common slidable spool.

In the case of solely driving the first actuator in the prior-art system thus constructed, when the spool is moved in one direction through a predetermined distance, the first variable restrictor is opened and the hydraulic fluid from the first hydraulic pump is supplied to the first actuator via the first variable restrictor and the first pressure compensating device, thereby driving the first actuator. When the spool is further moved under such a condition, the second variable restrictor is opened and the hydraulic fluid from the second hydraulic pump is delivered via the second variable restrictor and the second pressure compensating device to join with the hydraulic fluid from the first hydraulic pump before being supplied to the first actuator, thereby driving the first actuator at an increased speed.

In the case of solely driving the second actuator, the third variable restrictor is opened and the hydraulic fluid from the second hydraulic pump is supplied to the second actuator via the second variable restrictor and the second pressure compensating device, thereby driving the second actuator.

In the case of simultaneously driving the first and second actuators, the first to third pressure compensating devices control pressures downstream of the first to third variable restrictors, i.e., pressures between the first to third variable restrictors and the first to third pressure compensating devices, to become equal to the maximum load pressure selected by the first to third check valves and the signal pressure supply circuit. Accordingly, the hydraulic fluid from the first hydraulic pump can be properly distributed and supplied to the first and second actuators regardless of a difference in the magnitude of load pressure between the first and second actuators, thereby enabling combined operation of both the actuators.

DISCLOSURE OF THE INVENTION

The above prior art, however, has problems as follows.

In the above prior art, the maximum load pressure between the first and second actuators is applied as a common signal pressure to both the first and second regulators for controlling the respective flow rates of the first and second hydraulic pumps. Therefore, when the second actuator is driven by the hydraulic fluid from the second hydraulic pump, the load pressure of the second actuator is introduced as a maximum pressure to the regulator for the first hydraulic pump by the signal pressure supply circuit, and the first hydraulic pump is controlled to deliver a minimum flow rate at a pressure corresponding to the maximum load pressure. This results in the problem that the first and second hydraulic pumps cannot be operated independently of each other, the first hydraulic pump must remain in a standby state under the maximum load pressure, and an energy loss on the first hydraulic pump side is increased.

Similarly, when the first actuator is driven by the hydraulic fluid from the first hydraulic pump, the load pressure of the first actuator is introduced as a maximum pressure to the regulator for the second hydraulic pump by the signal pressure supply circuit, and the second hydraulic pump is controlled to deliver a minimum flow rate at a pressure corresponding to the maximum load pressure. This results in the problem that the first and second hydraulic pumps cannot be operated independently of each other, the second hydraulic pump must remain in a standby state for the maximum load pressure, and an energy loss on the second hydraulic pump side is increased.

Further, when the first and second actuators are simultaneously driven, the pressures downstream of the first to third variable restrictors are all controlled by the first to third pressure compensating devices to become equal to the maximum load pressure, and the maximum load pressure is introduced as a common signal pressure to the regulators for the first and second hydraulic pumps, whereby both the first and second hydraulic pump are controlled to deliver the hydraulic fluids at a delivery pressure corresponding to the maximum load pressure. Therefore, assuming that the first actuator is on the low load pressure side and the second actuator is on the high load pressure side, the first hydraulic pump which does not supply hydraulic fluid to the second actuator on the high load pressure side is also controlled to deliver the hydraulic fluid at a high delivery pressure corresponding to the high load pressure (maximum load pressure). Further, the associated first pressure compensating device produces a pressure loss corresponding to the pressure difference between the load pressure of the first actuator and the load pressure (maximum load pressure) of the second actuator, thereby generating a large energy loss.

An object of the present invention is to provide a hydraulic drive system of the type that at least two variable displacement hydraulic pumps are provided and regulators for the hydraulic pumps are driven with a signal pressure selected from load pressures of actuators to control delivery rates of the hydraulic pumps, which system can operate the two hydraulic pumps independently of each other and hence reduce an energy loss.

To achieve the above object, according to the present invention, there is provided a hydraulic drive system comprising first and second variable displacement hydraulic pumps, a first hydraulic actuator driven by hydraulic fluids delivered from said first and second hydraulic pumps, a second hydraulic actuator driven by the hydraulic fluid delivered from said second hydraulic pump, first variable restrictor means for controlling a flow rate of the hydraulic fluid supplied from said first hydraulic pump to said first hydraulic actuator, second variable restrictor means for controlling a flow rate of the hydraulic fluid supplied from said second hydraulic pump to said first hydraulic actuator, third variable restrictor means for controlling a flow rate of the hydraulic fluid supplied from said second hydraulic pump to said second hydraulic actuator, a first pressure compensating device for controlling a differential pressure across said first variable restrictor means, a second pressure compensating device for controlling a differential pressure across said second variable restrictor means, a third pressure compensating device for controlling a differential pressure across said third variable restrictor means, first delivery rate control means for controlling a delivery rate of said first hydraulic pump, second delivery rate control means for controlling a delivery rate of said second hydraulic pump, and a coupling circuit for joining the flow rate passing through said first variable restrictor means and the flow rate passing through said second variable restrictor means with each other and supplying the joined flow rate to said first hydraulic actuator, wherein said system further comprises first sensor means for detecting a pressure on the outlet side of said first pressure compensating device, second sensor means for detecting a pressure on the outlet side of said second pressure compensating device, third sensor means for detecting a pressure on the outlet side of said third pressure compensating device, first signal pressure supply means for supplying the pressure detected by said first sensor means, as a first signal pressure, to said first delivery rate control means, and second signal pressure supply means operated independently of said first signal pressure supply means for selecting higher one of the pressure detected by said second sensor means and the pressure detected by said third sensor means, and supplying the selected higher pressure as a second signal pressure to said second delivery rate control means.

With the present invention thus constructed, since the first signal pressure supply means and the second signal pressure supply means are independently of each other, mutual independence between the first hydraulic pump and the second hydraulic pump can be ensured.

In the above hydraulic drive system, preferably, an operating relationship between said first and second variable restrictor means is set such that when a demanded flow rate of said first hydraulic actuator is small, said first variable restrictor means is solely operated to supply only the hydraulic fluid from said first hydraulic pump to said first hydraulic actuator and when the demanded flow rate of said first hydraulic actuator is increased to exceed a predetermined value, said first and second variable restrictor means are both operated to supply both the hydraulic fluids from said first and second hydraulic pumps to said first hydraulic actuator.

In this case, the above hydraulic drive system preferably further comprises opening/closing means disposed in said coupling circuit and switched over from a closed position to an open position in response to a shift from sole operation of said first variable restrictor means to combined operation of said first and second variable restrictor means.

The above hydraulic drive system may further comprise opening/closing means disposed between the outlet side of said second pressure compensating device and said second sensor means and switched over from a closed position to an open position in response to a shift from sole operation of said first variable restrictor means to combined operation of said first and second variable restrictor means.

Also, in the above hydraulic drive system, said first and second variable restrictor means include notches formed in first and second spools, respectively, a positional relationship between said notches of said first and second variable restrictor means being set such that when said first and second spools have moved through a first predetermined distance, said notch of said first variable restrictor means is first opened and when said first and second spools have moved through a second predetermined distance larger than said first predetermined distance, said notch of said second variable restrictor means is then opened.

In this case, preferably, said second spool is further formed with an opening/closing portion for closing said coupling circuit before said second spool has moved through said second predetermined distance, and opening said coupling circuit when said second spool has moved through said second predetermined distance.

Said second spool may be further formed with an opening/closing portion for cutting off communication between the outlet side of said second pressure compensating device and said second sensor means before said second spool has moved through said second predetermined distance, and establishing said communication when said second spool has moved through said second predetermined distance.

Said first and second spools may be separate spools arranged parallel to each other, or may be arranged coaxially to each other in the form of a one-piece spool.

Preferably, the above hydraulic drive system further comprises a third hydraulic actuator driven by the hydraulic fluid delivered from said first hydraulic pump, fourth variable restrictor means for controlling a flow rate of the hydraulic fluid supplied from said first hydraulic pump to said third hydraulic actuator, a fourth pressure compensating device for controlling a differential pressure across said fourth variable restrictor means, and fourth sensor means for detecting an outlet pressure of said fourth pressure compensating device, wherein said first signal pressure supply means selects the higher one of the pressure detected by said first sensor means and the pressure detected by said fourth sensor means, and supplies the selected higher pressure as said first signal pressure to said first delivery rate control means.

BEST MODE FOR CARRYING OUT THE INVENTION

Hereinafter, embodiments of a hydraulic drive system of the present invention will be described with reference to the drawings.

The basic concept of a hydraulic drive system of the present invention will first be described as a first embodiment by referring to FIG. 1, and embodiments inclusive of valve structures for practicing the basic concept will be then described as second to fifth embodiments by referring to FIGS. 2 to 5.

Figure 1:
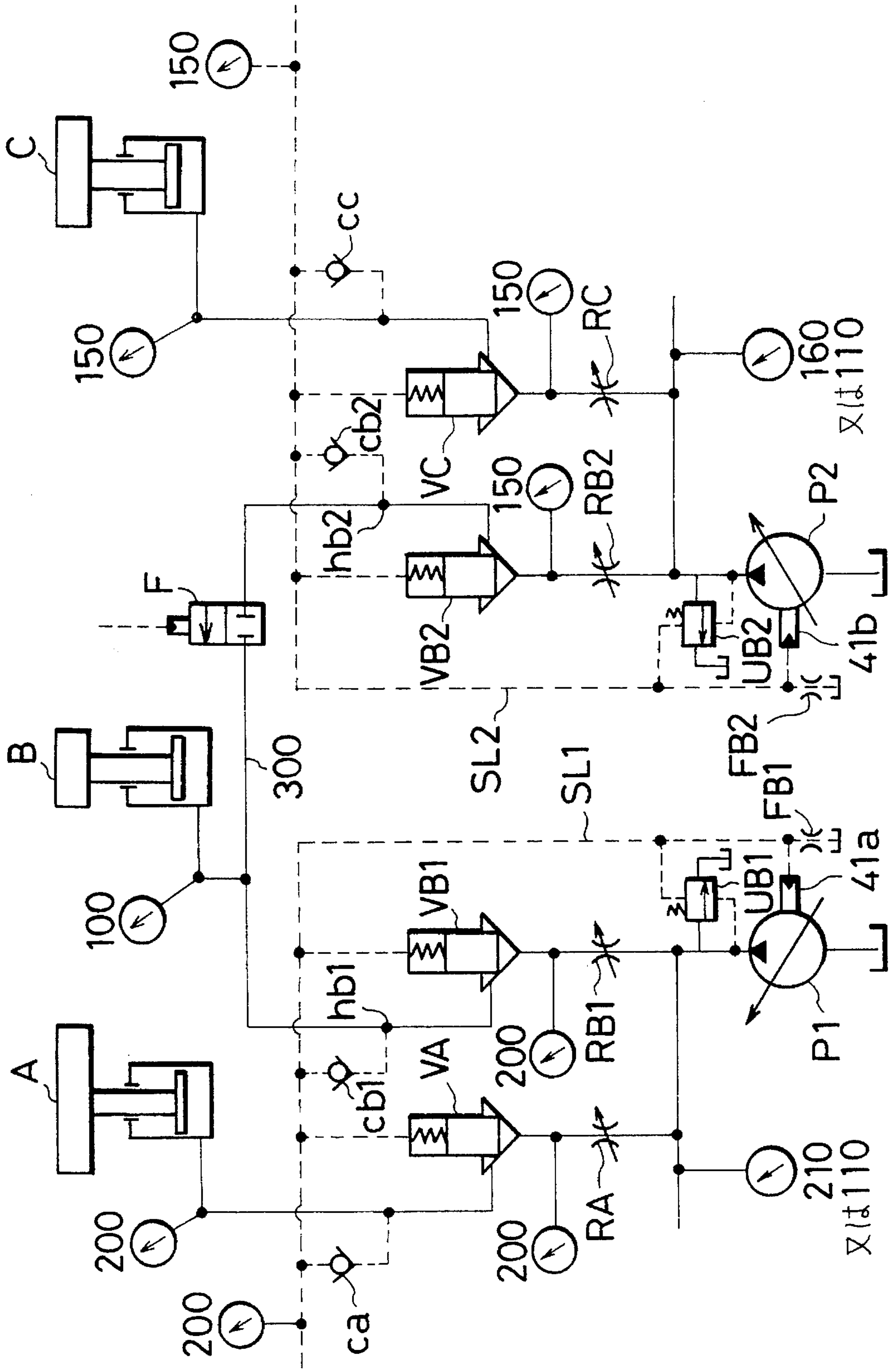
FIG. 1 is a diagram showing a hydraulic drive circuit according to a first embodiment of the present invention.

In FIG. 1, a hydraulic drive system of the first embodiment comprises a first variable displacement hydraulic pump P1, a second variable displacement hydraulic pump P2, and first and second pump regulators 41*a*, 41*b* for controlling delivery rates of the first and second hydraulic pumps, respectively.

Also in FIG. 1, denoted by A, B, C are actuators. The actuator A is associated with the first hydraulic pump P1, the actuator C is associated with the second hydraulic pump P2, and the actuator B is associated with both the first hydraulic pump P1 and the second hydraulic pump P2 because of needing the joined flow rate. Specifically, the actuator B is associated with the first hydraulic pump P1 in an initial stage of operation, and then also associated with the second hydraulic pump P2 in a subsequent stage of operation. By way of example, a load pressure of the actuator A is set to 200 atm., a load pressure of the actuator B is set to 100 atm., and a load pressure of the actuator C is set to 150 atm. This combination corresponds to the case where the civil. engineering and construction machine is a hydraulic excavator, and the actuators A, B, C are a boom cylinder, an arm cylinder and a bucket cylinder, respectively.

Denoted by RB1 is a first variable restrictor in communication with a delivery line of the first hydraulic pump P1 for controlling a flow rate of the hydraulic fluid supplied to the actuator B, RB2 is a second variable restrictor in communication with a delivery line of the second hydraulic pump P2 for controlling a flow rate of the hydraulic fluid supplied to the actuator B, RA is a third variable restrictor in communication with the delivery line of the first hydraulic pump P1 for controlling a flow rate of the hydraulic fluid supplied to the actuator A, and RC is a fourth variable restrictor in communication with the delivery line of the second hydraulic pump P2 for controlling a flow rate of the hydraulic fluid supplied to the actuator C.

Further, denoted by VB1 is a first pressure compensating device for controlling a differential pressure across the first variable restrictor RB1, VB2 is a second pressure compensating device for controlling a differential pressure across the second variable restrictor RB2, VA is a third pressure compensating device for controlling a differential pressure across the third variable restrictor RA, and VC is a fourth pressure compensating device for controlling a differential pressure across the fourth variable restrictor RC.

Denoted by cb1 is a first sensor means, i.e., a check valve, for detecting a pressure on the outlet side of the first pressure compensating device VB1, cb2 is a second sensor means, i.e., a check valve, for detecting a pressure on the outlet side of the second pressure compensating device VB2, ca is third sensor means, i.e., a check valve, for detecting a pressure on the outlet side of the third pressure compensating device VA, and cc is a fourth sensor means, i.e., a check valve, for detecting a pressure on the outlet side of the fourth pressure compensating device VC. Denoted by SL1 is a first signal pressure supply circuit, i.e., a maximum load pressure detecting line, for supplying higher one of the load pressures of the actuators B, A detected by the check valves cb1, ca, as a first signal pressure, to the first pump regulator 41*a*, and SL2 is a second signal pressure supply circuit, i.e., a maximum load pressure detecting line, for the supplying higher one of the load pressures of the actuators B, C detected by the check valves cb2, cc, as a second signal pressure, to the second pump regulator 41*b*.

Denoted by FB1 is a fixed restrictor disposed in a line communicating the maximum load pressure detecting line SL1 with a reservoir. When the actuators A, B are not operated, the fixed restrictor FB1 releases the pressure in the maximum load pressure detecting line SL1 into the reservoir to prevent a confined pressure from generating in the line SL1. Similarly, FB2 is a fixed restrictor disposed in a line communicating the maximum load pressure detecting line SL2 with the reservoir. When the actuators B, C are not operated, the fixed restrictor FB2 releases the pressure in the maximum load pressure detecting line SL2 into the reservoir to prevent a confined pressure from generating in the line SL2.

The pump regulator 41*a* is driven in response to the first signal pressure (i.e., a higher one of the load pressures of the actuators B, A) supplied through the maximum load pressure detecting line SL1, and controls the delivery rate of the first hydraulic pump P1 so that the pump delivery pressure is held by a predetermined value, e.g., 10 atm., higher than the first signal pressure. Accordingly, in the case where the load pressure of the actuator A is 200 atm. and the load pressure of the actuator B is 100 atm., as mentioned above, the first hydraulic pump P1 is controlled to deliver the hydraulic fluid at a pressure of 210 atm. when the load pressure of the actuator A is selected as the first signal pressure, and at a pressure of 110 atm. when the load pressure of the actuator B is selected as the first signal pressure.

Similarly, the pump regulator **41*b*** is driven in response to the second signal pressure (i.e., the higher one of the load pressures of the actuators B, C) supplied through the maximum load pressure detecting line SL2, and controls the delivery rate of the second hydraulic pump P2 so that the pump delivery pressure is held by a predetermined value, e.g., 10 atm., higher than the second signal pressure. Accordingly, in the case where the load pressure of the actuator B is 100 atm., and the load pressure of the actuator C is 150 atm., as mentioned above, the second hydraulic pump P2 is controlled to deliver the hydraulic fluid at a pressure of 110 atm. when the load pressure of the actuator B is selected as the second signal pressure, and at a pressure of 160 atm. when the load pressure of the actuator C is selected as the second signal pressure.

Also, the pump regulators **41*a*, 41*b*** have such a known input torque limiting control function with which the delivery rate of each of the first and second hydraulic pumps is controlled such that the pump delivery rate is reduced as the pump delivery pressure increases, when the pump delivery pressure exceeds a predetermined value.

Denoted by UB1 is an unloading valve for controlling the delivery pressure of the first hydraulic pump P1 so that a pressure difference between the delivery pressure of the first hydraulic pump P1 and the maximum load pressure selected by the maximum load pressure detecting line SL1 is held not larger than a predetermined value, e.g., 15 atm. When the actuators A, B are not operated, the pressure in the maximum load pressure detecting line SL1 is equal to the reservoir pressure, as mentioned above; hence the first hydraulic pump P1 is controlled to deliver the hydraulic fluid at a pressure of 15 atm. Similarly, UB2 is an unloading valve for controlling the delivery pressure of the second hydraulic pump P2 so that a pressure difference between the delivery pressure of the second hydraulic pump P2 and the maximum load pressure selected by the maximum load pressure detecting line SL2 is held not larger than a predetermined value, e.g., 15 atm. When the actuators B, C are not operated, the pressure in the maximum load pressure detecting line SL2 is equal to the reservoir pressure, as mentioned above; hence the second hydraulic pump P2 is controlled to deliver the hydraulic fluid at a pressure of 15 atm.

The load pressure detected by the maximum load pressure detecting line SL1, i.e., the first signal pressure, is also supplied to the first and third pressure compensating devices VB1, VA. The first and third pressure compensating devices VB1, VA control pressures downstream of the first and third variable restrictors RB1, RA, respectively, so that those pressures each become equal to the first signal pressure. Similarly, the load pressure detected by the maximum load pressure detecting line SL2, i.e., the second signal pressure, is also supplied to the second and fourth pressure compensating devices VB2, VC. The second and fourth pressure compensating devices VB2, VC control pressures downstream of the second and fourth variable restrictors RB2, RC, respectively, so that those pressures each become equal to the second signal pressure.

Denoted by 300 is a line capable of communicating the outlet side of the first pressure compensating device VB1 and the outlet side of the second pressure compensating device VB2, and also being in communication with the actuator B. F is an opening/closing valve disposed in the line 300 for connecting or disconnecting the line 300. The line 300 and the opening/closing valve F constitute a coupling circuit which can join the hydraulic fluid from the first hydraulic pump P1 that has passed a detecting position hb1 where the check valve cb1 detects the pressure on the outlet side of the first pressure compensating device VB1, and the hydraulic fluid from the second hydraulic pump P2 that has passed a detecting position hb2 where the check valve cb2 detects the pressure on the outlet side of the second pressure compensating device VB2.

In the hydraulic drive system thus constituted, when the actuator A is solely driven, the third variable restrictor RA is only operated to open, whereupon the hydraulic fluid from the first hydraulic pump P1 is supplied to the actuator A via the third variable restrictor RA and the third pressure compensating device VA, thereby driving the actuator A. At this time, the load pressure of the actuator A, i.e., 200 atm., is detected by the check valve ca and this 200 atm. is introduced as the first signal pressure to the third pressure compensating device VA which controls the pressure downstream of the third variable restrictor RA to become equal to the 200 atm. load pressure of the actuator A. simultaneously, the 200 atm. is also introduced as the first signal pressure to the first pump regulator **41*a*** through the maximum load pressure detecting line SL1, whereby the first hydraulic pump P1 is controlled to deliver the hydraulic fluid at a pressure of 210 atm.

On the other hand, since the maximum load pressure detecting line SL2 is functions independently of the maximum load pressure detecting line SL1 and mutual independence of the first and second hydraulic pumps P1, P2 is ensured in the above condition, the 200 atm. load pressure of the actuator A is not introduced to the maximum load pressure detecting line SL2 which is held at the reservoir pressure. Therefore, the second hydraulic pump P2 is not required to remain in a standby state for the load pressure of the actuator A and is controlled to deliver the hydraulic fluid at a pressure of 15 atm. under an action of the unloading valve UB2. As a result, an energy loss generated on the side of the second hydraulic pump P2 can be suppressed.

When the actuator C is solely driven, the fourth variable restrictor RC is only operated to open, whereupon the hydraulic fluid from the second hydraulic pump P2 is supplied to the actuator C via the fourth variable restrictor RC and the fourth pressure compensating device VC, thereby driving the actuator C. At this time, the load pressure of the actuator C, i.e., 150 atm., is detected by the check valve cc and this 150 atm. is introduced as the second signal pressure to the fourth pressure compensating device VC which controls the pressure downstream of the fourth variable restrictor RC to become equal to 150 atm. Simultaneously, the 150 atm. is also introduced as the second signal pressure to the second pump regulator **41*b*** through the maximum load pressure detecting line SL2, whereby the second hydraulic pump P2 is controlled to deliver the hydraulic fluid at a pressure of 160 atm.

Since the two maximum load pressure detecting lines SL1 and SL2 is also function independently of each other in this case, the maximum load pressure detecting line SL1 is held at the reservoir pressure similarly to the case of solely driving the actuator A. Therefore, the first hydraulic pump P1 is not required to remain in a standby state for the load pressure of the actuator C and is controlled to deliver the hydraulic fluid at a pressure of 15 atm. under an action of the unloading valve UB1. As a result, an energy loss generated on the side of the first hydraulic pump P1 can be suppressed.

When the actuator B is solely driven at a relatively low speed, the first variable restrictor RB1 is only operated to open while keeping the opening/closing valve F closed as shown in FIG. 1. In response to this operation, the hydraulic fluid from the first hydraulic pump P1 is supplied to the actuator B via the first variable restrictor RB1, the first pressure compensating device VB1 and the line 300, thereby driving the actuator B at a low speed. At this time, the load pressure of the actuator B, i.e., 100 atm., is detected by the check valve cb1 and this 100 atm. is introduced as the first signal pressure to the first pressure compensating device VB1 which controls the pressure downstream of the first variable restrictor RB1 to become equal to 100 atm. Simultaneously, the 100 atm. is also introduced as the first signal pressure to the first pump regulator 41*a* through the maximum load pressure detecting line SL1, whereby the first hydraulic pump P1 is controlled to deliver the hydraulic fluid at a pressure of 110 atm.

With the opening/closing valve F kept closed, the 100 atm. load pressure of the second actuator B is not introduced to the maximum load pressure detecting line SL2 similarly to the case of solely driving the actuator A. Therefore, the second hydraulic pump P2 is not required to remain in a standby state for the load pressure of the actuator B and an energy loss generated on the side of the second hydraulic pump P2 can be suppressed.

Further, when the actuator B is solely driven at a high speed, the opening/closing valve F is switched over to open and the second variable restrictor RB2 is additionally operated to open in the above condition. In response to this operation, the hydraulic fluid from the second hydraulic pump P2 is joined with the hydraulic fluid from the first hydraulic pump P1 and then supplied to the actuator B via the second variable restrictor RB2, the second pressure compensating device VB2, the line 300 and the opening/closing valve F, thereby driving the actuator B at a high speed. At this time, since the line 300 is connected thoroughly, the load pressure of the actuator B is detected by the check valves cb1, cb2 as the same 100 atm. and this 100 atm. is introduced as the first signal pressure to both the first pressure compensating device VB1 and the second pressure compensating device VB2 which respectively control the pressures downstream of the first variable restrictor RB1 and the second variable restrictor RB2 to become equal to 100 atm. Simultaneously, the 100 atm. is also introduced as the first signal pressure to both the first pump regulator 41*a* and the second pump regulator 41*b* through the maximum load pressure detecting lines SL1, SL2, whereby the pump regulators 41*a*, 41*b* are driven at the same 100 atm. and both the hydraulic pumps P1, P2 are controlled to deliver the hydraulic fluid at a pressure of 110 atm.

Figure 5:
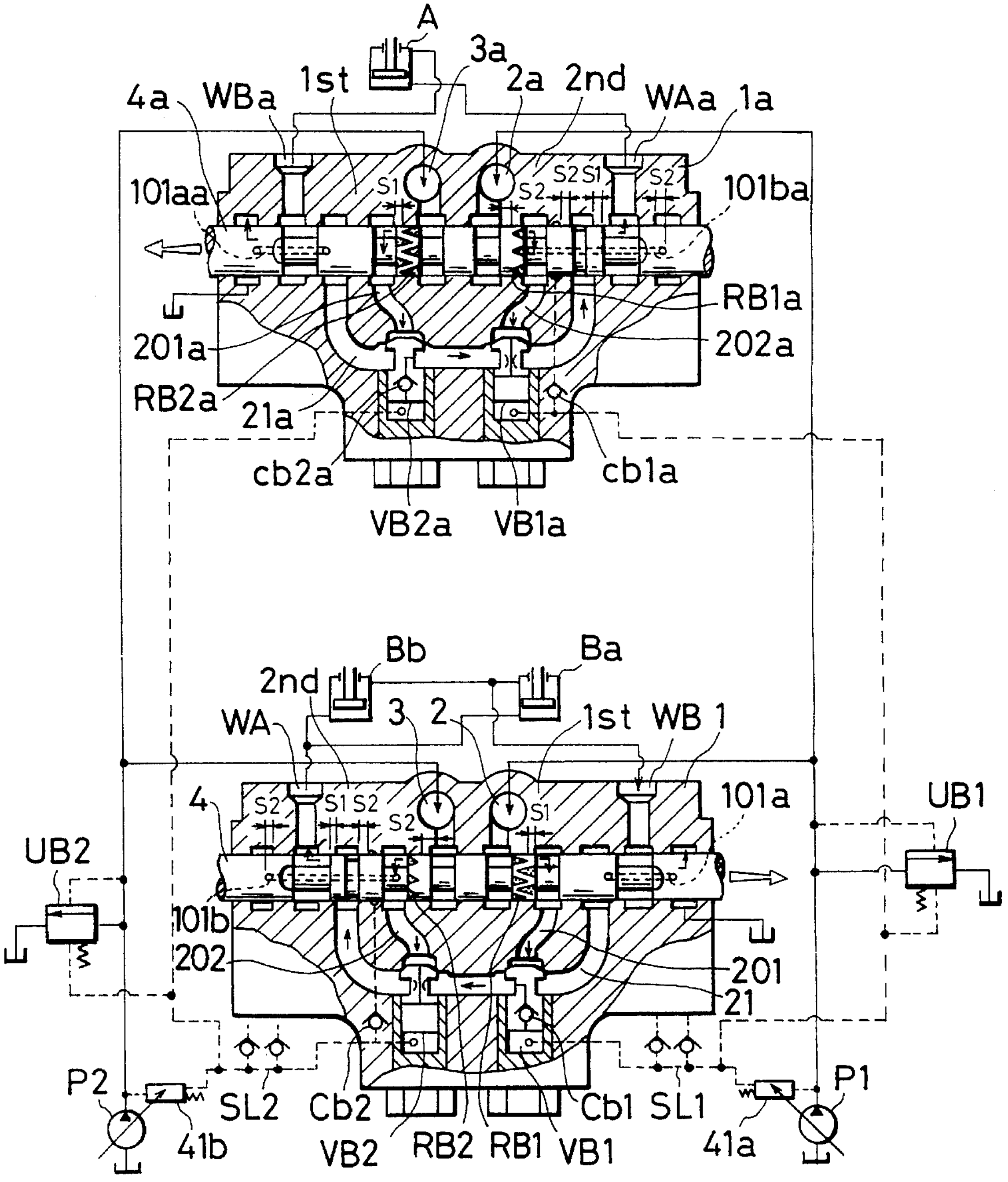
FIG. 5 is a diagram showing principal part of a hydraulic drive circuit according to a fifth embodiment of the present invention.

In the case of combined operation where the actuator S is driven at a low speed with the opening/closing valve F kept closed as shown in FIG. 5 and the actuator A is driven, the first variable restrictor RB1 and the third variable restrictor RA are both operated to open. At this time, the higher one of the 100 atm. load pressure of the actuator B detected by the check valve cb1 and the 200 atm. load pressure of the actuator A detected by the check valve ca, i.e., 200 atm., is introduced as the first signal pressure to both the first pressure compensating device VB1 and the third pressure compensating device VA. Therefore, the pressures downstream of the first variable restrictor RB1 and the third variable restrictor RA are controlled to become the same 200 atm. Simultaneously, the 200 atm. is also introduced as the first signal pressure to the first pump regulator 41*a* through the maximum load pressure detecting line SL1, whereby the first hydraulic pump P1 is controlled to deliver the hydraulic fluid at a pressure of 210 atm. In this case, pressures upstream of the first variable restrictor RB1 and the third variable restrictor RA are both equal to the delivery pressure of the first hydraulic pump P1, i.e., 210 atm., while the pressures downstream thereof are both equal to 200 atm., as mentioned above. Accordingly, since the differential pressures across the first variable restrictor RB1 and the third variable restrictor RA are both equal to 10 atm., the flow rate of the first hydraulic pump P1 can be distributed and supplied depending on a ratio of opening areas between the first variable restrictor RB1 and the third variable restrictor RA regardless of the magnitudes of the load pressures of the actuators A, B, thus enabling the desired combined operation of the actuators A, B.

With the opening/closing valve F kept also closed in this case, higher the one of the load pressure of the actuator A and the load pressure of the actuator B, i.e., 200 atm., is not introduced to the maximum load pressure detecting line SL2 similarly to the case of solely driving the actuator A or solely driving the actuator B at a low speed. Therefore, the second hydraulic pump P2 is not required to remain in a standby state for the load pressure of the actuator A and an energy loss generated on the side of the second hydraulic pump P2 can be suppressed.

When the opening/closing valve F is switched over to open the second variable restrictor RB2 is additionally operated to open in the above condition with an intention of driving the actuator B at a higher speed, the hydraulic fluid from the second hydraulic pump P2 is joined with the hydraulic fluid from the first hydraulic pump P1 and then supplied to the actuator B via the second variable restrictor RB2, the second pressure compensating device VB2, the line 300 and the opening/closing valve F, thereby driving the actuator B at a high speed. At this time, since the line 300 is connected, the load pressure of the actuator B, i.e., 100 atm., is detected by the check valve cb2 and introduced as the second signal pressure to the second pressure compensating device VB2 which controls the pressure downstream of the second variable restrictor RB2 to become equal to 100 atm. Simultaneously, the 100 atm. is also introduced as the first signal pressure to the second pump regulator 41*b* through the maximum load pressure detecting line SL2, whereby the second hydraulic pump P2 is controlled to deliver the hydraulic fluid at a pressure of 110 atm.

Thus, during the combined operation of the actuator B at a high speed and the actuator A, since the two maximum load pressure detecting lines (i.e., the first and second signal pressure supply circuits) SL1, SL2 function independently of each other to ensure mutual independence of the two first and second hydraulic pumps P1, P2, the first hydraulic pump P1 is controlled to deliver the hydraulic fluid at a pressure of 210 atm. and the second hydraulic pump P2 is controlled to deliver the hydraulic fluid at a pressure of 110 atm.

With the prior art disclosed in the above-cited JP, A, 2-248705 which has a common maximum load pressure detecting line (i.e., signal pressure supply circuit), however, during the same combined operation, the load pressure of the actuator A, i.e., 200 atm., is introduced as a signal pressure to the second pressure compensating device VB2 and the second pump regulator 41*b* as well, whereby the second hydraulic pump P2 is controlled to deliver the hydraulic fluid at a pressure of 210 atm. and the second pressure compensating device VB2 controls the pressure downstream of the second variable restrictor RB2 to become equal to 200 atm. Comparing the disclosed prior art and this embodiment, therefore, the pressure loss is reduced by an amount of (210–110=100 atm.)×(delivery pressure of second hydraulic pump) in this embodiment and the energy loss is reduced correspondingly. Also, since the differential pressure across the second pressure compensating device VB2 is reduced from 200–100=100 atm. in the prior art to 100–100=0 atm., heat generation in the second pressure compensating device VB2 corresponding to 100 atm. is avoided, resulting in an improvement of heat balance.

Additionally, the pump regulators 41*a*, 41*b* have a known input torque limiting control function, as explained before. In the above prior art, since the first and second hydraulic pumps P1, P2 are both controlled to deliver the hydraulic fluid at a high pressure of 210 atm., both the flow rates delivered from the first and second hydraulic pump P1, P2 are reduced under the input torque limiting control function, leading to a drawback that speeds of the actuators A, B are lowered remarkably. On the contrary, since the first and second hydraulic pumps P1, P2 function independently of each other in this embodiment, the second hydraulic pump P2 is controlled to deliver the hydraulic fluid at a low pressure of 110 atm., thereby preventing a remarkable fall in the speeds of the actuators A, B. As a result, working efficiency in the combined operation of the actuators A, B can be improved.

In the case of combined operation where the actuator B is driven at a low speed with the opening/closing valve F kept closed as shown in FIG. 5 and the actuator C is driven the first variable restrictor RB1 and the fourth variable restrictor RC are both operated to open. At this time, the load pressure of the actuator B, i.e., 100 atm., detected by the check valve cb1 is introduced as the first signal pressure to the first pressure compensating device VB1 which controls the pressure downstream of the first variable restrictor RB1 to become equal to 100 atm., while the load pressure of the actuator C, i.e., 150 atm., detected by the check valve cc is introduced as the second signal pressure to the fourth pressure compensating device VC which controls the pressure downstream of the fourth variable restrictor RC to become equal to 150 atm. Simultaneously, the 100 atm. load pressure of the actuator B is also introduced as the first signal pressure to the first pump regulator 41*a* through the maximum load pressure detecting line SL1, whereby the first hydraulic pump P1 is controlled to deliver the hydraulic fluid at a pressure of 110 atm., while the 150 atm. load pressure of the actuator C is also introduced as the second signal pressure to the second pump regulator 41*b* through the maximum load pressure detecting line SL2, whereby the second hydraulic pump P2 is controlled to deliver the hydraulic fluid at a pressure of 160 atm. In this case, therefore, the actuator B is driven by only the hydraulic fluid from the first hydraulic pump P1 and the actuator C is driven by only the hydraulic fluid from the second hydraulic pump P2, thus enabling the desired combined operation of the actuators B, C.

Further, since the first hydraulic pump P1 is controlled to deliver the hydraulic fluid at a pressure of 110 atm. and the second hydraulic pump P2 is controlled to deliver the hydraulic fluid at a pressure of 160 atm., the pressure loss on the side of the first hydraulic pump P1 is reduced by an amount 160–110=of 50 atm.×(delivery pressure of first hydraulic pump) in this case as compared with the prior art similarly to the above case of combined operation of the actuator B at a high speed and the actuator A, and the energy loss is reduced correspondingly. Also, since the differential pressure across the first pressure compensating device VB1 is reduced from 150–100=50 atm. in the prior art to 100–100=0 atm., heat generation in the first pressure compensating device VB1 corresponding to 50 atm. is avoided, resulting in an improvement of heat balance. Additionally, a reduction in the pump delivery rate resulted from the input torque limiting control function of the pump regulators 41*a*, 41*b* is suppressed and working efficiency in the combined operation of the actuators B, C can be improved.

When the opening/closing valve F is switched over to open and the second variable restrictor RB2 is additionally operated to open in the above condition with an intention of driving the actuator B at a higher speed, a part of the hydraulic fluid from the second hydraulic pump P2 is joined with the hydraulic fluid from the first hydraulic pump P1 and then supplied to the actuator B via the second variable restrictor RB2, the second pressure compensating device VB2, the line 300 and the opening/closing valve F, thereby driving the actuator B at a high speed. At this time, since the line 300 is connected thoroughly, the load pressure of the actuator B, i.e., 100 atm., is going to be detected by the check valve cb2. But the load pressure of the actuator C, i.e., 150 atm., detected by the check valve cc is higher than 100 atm. and, therefore, the pressure in the maximum load pressure detecting line SL2 is held at 150 atm. so far detected. Accordingly, that 150 atm. is introduced as the second signal pressure to both the second pressure compensating device VB2 and the fourth pressure compensating device VC which control the pressures downstream of the second variable restrictor RB2 and the fourth variable restrictor RC to become equal to 150 atm. The second hydraulic pump P2 is controlled to deliver the hydraulic fluid at a pressure of the same 160 atm. as before.

In this case, pressures upstream of the second variable restrictor RB2 and the fourth variable restrictor RC are both equal to the delivery pressure of the second hydraulic pump P2, i.e., 160 atm., while the pressures downstream thereof are both equal to 150 atm., as mentioned above. Accordingly, since differential pressures the across the second variable restrictor RB2 and the fourth variable restrictor RC are both equal to 10 atm., the flow rate of the second hydraulic pump P2 can be distributed and supplied depending on a ratio of opening areas between the second variable restrictor RB2 and the fourth variable restrictor RC regardless of the magnitudes of the load pressures of the actuators B, C, thus enabling the desired combined operation of the actuators B, C.

Further, similarly to the above case of combined operation of the actuator B at a low speed and the actuator C, the pressure loss on the side of the second hydraulic pump P1 is reduced by an amount of (160–110=50 atm.)×(delivery pressure of first hydraulic pump) in this case as compared with the prior art and the energy loss is reduced correspondingly. Also, heat generation in the first pressure compensating device VB1 corresponding to 50 atm. is avoided, resulting in an improvement of heat balance. Additionally, a reduction in the pump delivery rate resulted from the input torque limiting control function of the pump regulators 41*a*, 41*b* is suppressed and working efficiency in the combined operation of the actuators B, C can be improved.

In the case of simultaneously driving the actuator A and the actuator C, the third variable restrictor RA and the fourth variable restrictor RC are both operated to open. In response to this operation, the hydraulic fluid from the first hydraulic pump P1 is supplied to the actuator A via the third variable restrictor RA and the third pressure compensating device VA and the hydraulic fluid from the second hydraulic pump P2 is supplied to the actuator C via the fourth variable restrictor RC and the fourth pressure compensating device VC, thereby enabling the combined operation of the actuators A, C. At this time, the load pressure of the actuator A, i.e., 200 atm., detected by the check valve ca is introduced as the first signal pressure to the third pressure compensating device VA which controls the pressure downstream of the third variable restrictor RA to become equal to 200 atm., while the load pressure of the actuator C, i.e., 150 atm., detected by the check valve cc is introduced as the second signal pressure to the fourth pressure compensating device VC which controls the pressure downstream of the fourth variable restrictor RC to become equal to 150 atm. Simultaneously, the 200 atm. load pressure of the actuator A is also introduced as the first signal pressure to the first pump regulator 41*a* through the maximum load pressure detecting line SL1, whereby the first hydraulic pump P1 is controlled to deliver the hydraulic fluid at a pressure of 210 atm. in a flow rate corresponding to the demanded flow rate, while the 150 atm. load pressure of the actuator C is also introduced as the second signal pressure to the second pump regulator 41*b* through the maximum load pressure detecting line SL2, whereby the second hydraulic pump P2 is controlled to deliver the hydraulic fluid at a pressure of 160 atm. in a flow rate corresponding to the demanded flow rate.

In this case, therefore, similarly to the above-explained combined operation of the actuator B at a high speed and the actuator A, the pressure loss on the side of the second hydraulic pump P2 is reduced by an amount of (210–160=50 atm.)×(delivery pressure of second hydraulic pump) as compared with the prior art and the energy loss is reduced correspondingly. Also, since the differential pressure across the fourth pressure compensating device VC is reduced from 200–150=50 atm. in the prior art to 150–150=0 atm., heat generation in the second pressure compensating device VB2 corresponding to 50 atm. is avoided, resulting in an improvement of heat balance. Additionally, a reduction in the pump delivery rate resulted from the input torque limiting control function of the pump regulators 41*a*, 41*b* is suppressed and working efficiency in the combined operation of the actuators A, C can be improved.

In the case of combined operation where the actuator B is driven at a low or high speed and the actuators A, C are also driven, the first variable restrictor RB1, the third variable restrictor RA and the fourth variable restrictor RC, or all the first to fourth variable restrictors are operated to open. In response to this operation, on the side of the first hydraulic pump P1, the pressures downstream of the first and third variable restrictors RB1, RA are controlled to become equal to the load pressure of the actuator A, i.e., 200 atm. and the first hydraulic pump P1 is controlled to deliver the hydraulic fluid at a pressure of 210 atm., similarly to the combined operation of the actuators A, B. On the side of the second hydraulic pump P2, the pressures downstream of the second and fourth variable restrictors RB2, RC are controlled to become equal to the load pressure of the actuator C, i.e., 150 atm. and the second hydraulic pump P2 is controlled to deliver the hydraulic fluid at a pressure of 160 atm., similarly to the combined operation of the actuators B, C.

In this case, therefore, the pressure loss on the side of the second hydraulic pump P2 is likewise reduced and the energy loss is reduced correspondingly. Also, heat generation in the second and fourth pressure compensating devices VB2, VC is avoided, resulting in an improvement of heat balance. Additionally, a reduction in the pump delivery rate resulted from the input torque limiting control function of the pump regulators 41*a*, 41*b* is suppressed and working efficiency in the combined operation of the actuators A, B, C can be improved.

Moreover, since the combined operation can be realized in such a combination that the actuator A and the actuator B (low speed) are driven only by the hydraulic fluid from the first hydraulic pump P1 and the actuator C is driven only by the hydraulic fluid from the second hydraulic pump P2, as mentioned above, it is possible to increase the kinds of works which can be achieved by the actuators A, B, C.

If the load pressures hold the relationship mentioned above and shown in FIG. 1, mutual independence between the two hydraulic pumps P1, P2 is not lost during the combined operation of the actuator B at a low speed and the actuator C even with no provision of the opening/closing valve F shown in FIG. 1. However, if the load pressure of the actuator B is higher than the load pressure of the actuator C, the second hydraulic pump P2 would also be controlled by the load pressure of the actuator B and the advantage of mutual independence between the two hydraulic pumps P1, P2 could not be fully utilized. Even in such a case, the presence of the opening/closing valve F can surely provide the mutual independence between the two hydraulic pumps P1, P2. The following embodiments are arranged to include a function of the opening/closing valve F shown in FIG. 1.

Figure 2:
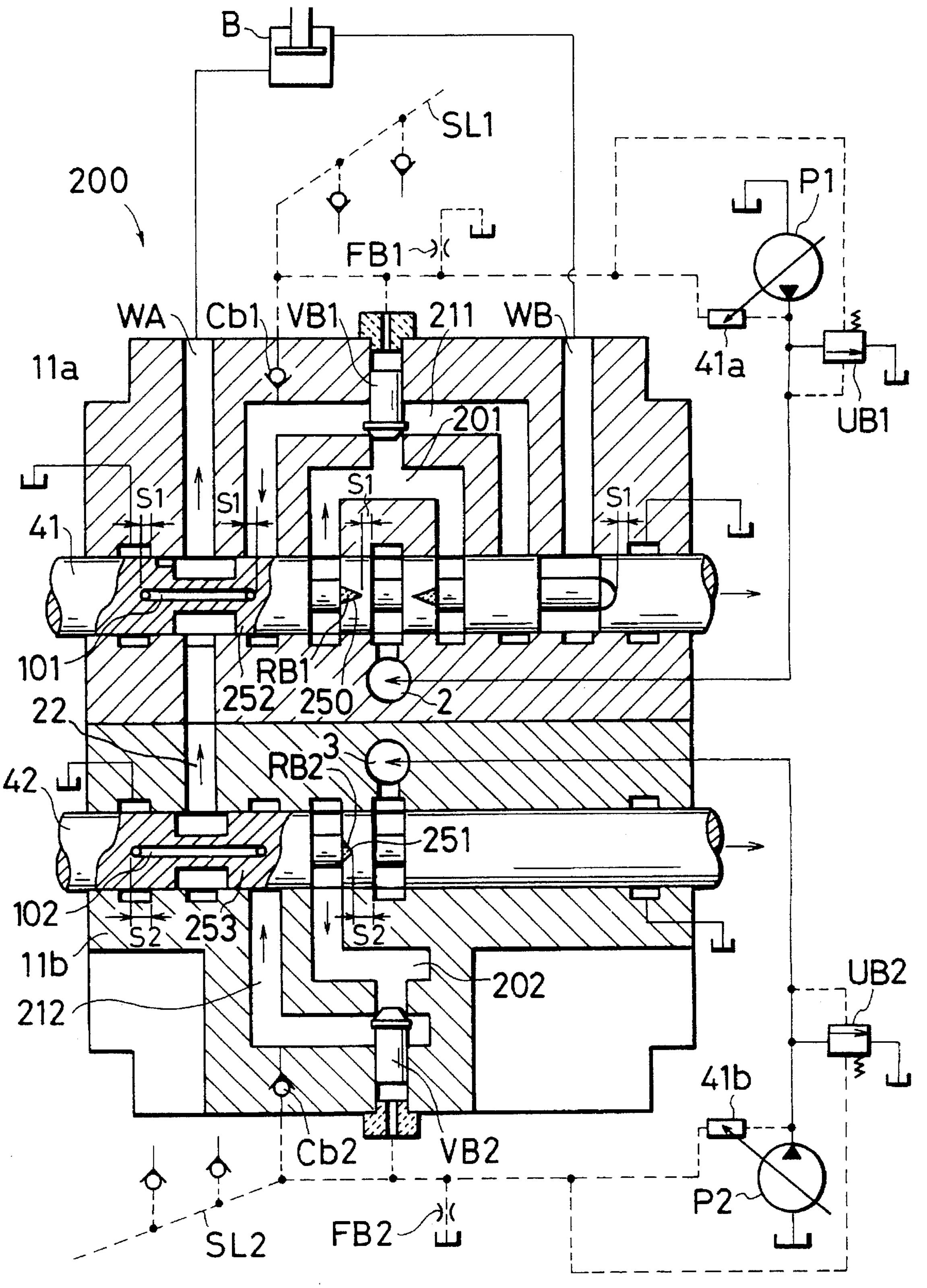
FIG. 2 is a diagram showing principal part of a hydraulic drive circuit according to a second embodiment of the present invention.

FIG. 2 shows a hydraulic drive system according to a second embodiment of the present invention. In the illustrated second embodiment, those parts corresponding to the actuators A, C, the variable restrictors and pressure compensating devices associated with the actuators A, C, etc. in the above first embodiment of FIG. 1 are omitted. Note that those members in FIG. 2 identical to those shown in FIG. 1 are denoted by the same reference numerals.

A hydraulic drive system of the second embodiment shown in FIG. 2 also comprises a first hydraulic pump P1, a second hydraulic pump P2, a first pump regulator 41*a* for controlling a delivery rate of the first hydraulic pump P1, a second pump regulator 41*b* for controlling a delivery rate of the second hydraulic pump P2, and an actuator B driven by hydraulic fluids delivered from the hydraulic pumps P1, P2.

Denoted by 200 is a valve apparatus disposed between the hydraulic pumps P1, P2 and the actuator B for controlling a flow of the hydraulic fluid supplied to the actuator B. The valve apparatus 200 comprises two valve bodies 11*a*, 11*b* connected together into a one-piece. A slidable spool 41 is disposed in the valve body 11*a*. Also, in the valve body 11*a*, there are provided a pump port 2 in communication with a delivery line of the first hydraulic pump P1, a passage 201 capable of communicating with the pump port 2, a first variable restrictor RB1 to have a notch 250 formed around the spool 41 and disposed between the pump port 2 and the passage 201, a passage 211 capable of communicating with the passage 201, a first pressure compensating device VB1 disposed between the passage 201 and the passage 211, load passages WA, WB capable of communicating with the passage 211, an opening/closing portion 252 formed in the spool 41 for switching over communication between the passage 211 and the load passages WA, WB, a check valve cb1 constituting first sensor means for detecting a pressure on the outlet side of the first pressure compensating device VB1, and a passage 101 communicating with a reservoir in a neutral state. On the other hand, a slidable spool 42 is disposed in the valve body 11*b*. Also, in the valve body 11*b*, there are provided a pump port 3 in communication with a delivery line of the second hydraulic pump P2, a passage 202 capable of communicating with the pump port 3, a second variable restrictor RB2 having a notch 251 formed around the spool 42 and disposed between the pump port 3 and the passage 202, a passage 212 capable of communicating with the passage 202, a second pressure compensating device VB2 disposed between the passage 202 and the passage 212, a passage 22 capable of communicating with the passage 212, an opening/closing portion 253 formed in the spool 42 for switching over communication between the passage 212 and the passage 22, a check valve cb2 constituting second sensor means for detecting a pressure on the outlet side of the first pressure compensating device VB2, and a passage 102 communicating with the reservoir in a neutral state. The passage 22 is formed to be communicated with the load passage WA. The load pressures WA, WB are respectively communicated with a bottom chamber and a rod chamber of the actuator B.

The passages 101 and 102 constitute means for preventing a load holding pressure in the neutral state from being transmitted to the first pump regulator 41*a* and the second pump regulator 41*b*.

The check valve cb1 is communicated with a maximum load pressure detecting line SL1 for introducing the highest one of load pressures of the actuators inclusive of not-shown actuators, to which the hydraulic fluid from the first hydraulic pump P1 is supplied, as a first signal pressure to the first pressure compensating device VB1 and the first pump regulator 41*a*. Similarly, the check valve cb2 is communicated with a maximum load pressure detecting line SL2 for the introducing the highest one of load pressures of the actuators including another not-shown actuator, to which the hydraulic fluid from the second hydraulic pump P2 is supplied, as a second signal pressure to the second pressure compensating device VB2 and the second pump regulator 41*b*.

The positional relationship of the notch 250 and the opening/closing portion 252 is set so that when the spool 41 disposed in the valve body 11*a* has moved through a first predetermined distance S1, the first variable restrictor RB1 starts opening and, at the same time, the passage 211 positioned on the outlet side of the first pressure compensating device VB1 comes into communication with the load passage WA or WB. Also, the position of the passage 101 is set so that when the spool 41 has moved through the first predetermined distance S1, the passage 101 is immediately cut off from the reservoir. Furthermore, the positional relationship of the notch 251 and the opening/closing portion 253 is set so that when the spool 42 disposed in the valve body 11*b* has moved to the right in FIG. 2 through a second predetermined distance S2 larger than the first predetermined distance S1, the second variable restrictor RB2 starts opening and, at the same time, the passage 212 positioned on the outlet side of the second pressure compensating device VB2 comes into communication with the load passage WA via the passage 22. Also, the position of the passage 102 is set so that when the spool 42 has moved through the second predetermined distance S2, the passage 102 is immediately cut off from the reservoir.

In the above construction, the passage 212 and the passage 22 correspond to the line 300 of the coupling circuit in the above first embodiment of FIG. 1, and the opening/closing portion 253 formed in the spool 42 corresponds to the opening/closing valve F. Thus, the opening/closing portion 253 closes the coupling circuit before the spool 42 has moved through the second predetermined distance S2, and opens the coupling circuit after the spool 42 has moved through the second predetermined distance S2.

The second embodiment thus constructed operates as follows.

In the neutral state as shown in FIG. 2, for example, since the passage 211 is held in communication with the reservoir via the passage 101, a confined pressure will not be produced in the passage 211 and, therefore, such a confined pressure will never be introduced to the maximum load pressure detecting line SL1 via the check valve cb1. Likewise, since the passage 212 is held in communication with the reservoir via the passage 102 in the neutral state, a confined pressure will not be produced in the passage 212 and, therefore, such a confined pressure will never be introduced to the maximum load pressure detecting line SL2 via the check valve cb2.

When both the spools 41, 42 are moved to the right in FIG. 1, for example, to such an extent as being somewhat larger than the first predetermined distance S1 (but not reaching the second predetermined distance S2) in the above neutral state, the communication between the passage 101 and the reservoir is cut off, the communication between the passage 102 and the reservoir remains continued, the pump port 2 in the valve body 11*a* is communicated with the passage 201 via the first variable restrictor RB1, and further the passage 211 is communicated with the load passage WA. Accordingly, the load pressure of the actuator B is detected by the check valve cb1 and applied to the maximum load pressure detecting line SL1. As a result, the actuator B can be driven at a low speed similarly to the above first embodiment shown in FIG. 1.

At this time, the second variable restrictor RB2 in the valve body 11*b* is closed and the pump port 3 is not communicated with the passage 202. Also, the passage 212 is not communicated with the passage 22 in communication with the load passage WA, but communicated with the passage 102 in communication with the reservoir; hence the pressure detected by the check valve cb2 is low one corresponding to the reservoir pressure. Assuming now that another actuators (not shown) associated with the second hydraulic pump P2 is not driven, a signal pressure corresponding to the reservoir pressure is introduced to a pressure receiving chamber of the second pressure compensating device VB2 and the second pump regulator 41*b*, whereby the second hydraulic pump P2 is controlled to deliver the hydraulic fluid at a pressure of 15 atm. set by the unloading valve UB2.

In the case of simultaneously driving the actuator B and another actuator (not shown) associated with the first hydraulic pump P1 under the above condition that both the spools 41, 42 are moved to such an extent as being somewhat larger than the first predetermined distance S1, the highest one of load pressures of the actuators associated with the first hydraulic pump P1, including the load pressure of the actuator B, is introduced as a signal pressure to a pressure receiving chamber of the first pressure compensating device VB1 and the first pump regulator 41*a*. Accordingly, a pressure downstream of the first variable restrictor RB1 and a pressure downstream of a not-shown variable restrictor for controlling the driving of the not-shown actuator are controlled to become equal to the signal pressure introduced through the maximum load pressure detecting line SL1, and the delivery rate of the first hydraulic pump P1 is controlled to a value corresponding to the aforesaid signal pressure. At this time, pressures upstream of the first variable restrictor RB1 and the variable restrictor associated with the not-shown actuator are both equal to the delivery pressure of the first hydraulic pump P1, while the pressures downstream thereof are both equal to the aforesaid signal pressure. Accordingly, since differential pressures across the first variable restrictor RB1 and the not-shown variable restrictor are equal to each other, the flow rate of the first hydraulic pump P1 can be distributed and supplied to the actuators depending on a ratio of opening areas between the two variable restrictors without being affected by fluctuations in the load pressure of the actuator on the opposite side, thus enabling the desired combined operation.

Also in this case, similarly to the case of solely driving the actuator B at a low speed, the second variable restrictor RB2 in the valve body 11*b* is closed and the pump port 3 is not communicated with the passage 202. Also, the passage 212 is not communicated with the passage 22 in communication with the load passage WA, but communicated with the passage 102 in communication with the reservoir; hence the pressure detected by the check valve cb2 is low one corresponding to the reservoir pressure. Assuming now that another actuator (not shown) associated with the second hydraulic pump P2 is not driven, a signal pressure corresponding to the reservoir pressure is introduced to a pressure receiving chamber of the second pressure compensating device VB2 and the second pump regulator 41*b*, whereby the second hydraulic pump P2 is controlled to deliver the hydraulic fluid at a pressure of 15 atm. set by the unloading valve UB2.

In the case of simultaneously driving the actuator B and another actuator (not shown) associated with the second hydraulic pump P2 under the above condition that both the spools 41, 42 are moved to such an extent as being somewhat larger than the first predetermined distance S1, the first hydraulic pump P1 is controlled similarly to the case of solely driving the actuator B, and the second hydraulic pump P2 is controlled to deliver the hydraulic fluid at a pressure corresponding to the load pressure of another not-shown actuator. Accordingly, the desired combined operation can be implemented without being affected by fluctuations in the load pressure of the actuator on the opposite side.

Further, similarly to the first embodiment, since the mutual independence between the first and second hydraulic pumps P1, P2 is ensured, the pressure loss in hydraulic pumps associated with the actuators on the side of the lower load pressure is reduced and the energy loss is reduced correspondingly. Also, heat generation in the pressure compensating devices is avoided, resulting in an improvement of heat balance. Additionally, a reduction in the pump delivery rate resulted from the input torque limiting control function of the pump regulators 41*a*, 41*b* is suppressed and working efficiency in the combined operation of plural actuators can be improved.

During the sole operation of the actuator B, when both the spools 41, 42 are further moved to the right in FIG. 2 beyond the second predetermined distance S2 in the above condition that both the spools have been moved to such an extent as being somewhat larger than the first predetermined distance S1, the above state remains continued on the side of the first hydraulic pump P1. On the side of the second hydraulic pump P2, however, the communication between the passage 102 and the reservoir is cut off, the pump port 3 in the valve body 11*b* is communicated with the passage 202 via the second variable restrictor RB2, and further the passage 212 is communicated with the passage 22 in communication with the load passage WA. Accordingly, the load pressure of the actuator B is detected by the check valve cb2 and applied to the maximum load pressure detecting line SL2. As a result, the second hydraulic pump P2 is also controlled to deliver the hydraulic fluid at a pressure corresponding to the load pressure of the actuator B.

At this time, the hydraulic fluid supplied from the second hydraulic pump P2 via the pump port 3, the second variable restrictor RB2, the passage 202, the second pressure compensating device VB2, the passage 212 and the passage 22 in the valve body 11*b* is joined with the hydraulic fluid supplied from the first hydraulic pump P1 via the passage 211 and the load passage WA. The joined flow rate is supplied to the bottom side of the actuator B, thereby increasing the speed of extension of the actuator B.

In the case of simultaneously driving the actuator B and another actuator (not shown) associated with the second hydraulic pump P2 under the above condition that both the spools 41, 42 are moved beyond the second predetermined distance S2, the highest one of load pressures of the actuators associated with the second hydraulic pump P2, including the load pressure of the actuator B, is introduced as a signal pressure to the pressure receiving chamber of the second pressure compensating device VB2 and the second pump regulator 41*b*. Accordingly, a pressure downstream of the second variable restrictor RB2 and a pressure downstream of a variable restrictor for controlling the driving of the not-shown actuator are controlled to become equal to the signal pressure introduced through the maximum load pressure detecting line SL2, and the delivery rate of the second hydraulic pump P2 is controlled to a value corresponding to the aforesaid signal pressure. At this time, pressures upstream of the second variable restrictor RB2 and the variable restrictor associated with the notshown actuator are both equal to the delivery pressure of the second hydraulic pump P2, while the pressures downstream thereof are both equal to the aforesaid signal pressure. Accordingly, since differential pressures across the second variable restrictor RB2 and the not-shown variable restrictor are equal to each other, the flow rate of the second hydraulic pump P2 can be distributed and supplied to the actuators depending on a ratio of opening areas between the two variable restrictors without being affected by fluctuations in the load pressure of the actuator on the opposite side, thus enabling the desired combined operation. At this time, the hydraulic fluid supplied from the second hydraulic pump P2 via the pump port 3, the second variable restrictor RB2, the passage 202, the second pressure compensating device VB2, the passage 212 and the passage 22 in the valve body 11*b* is joined with the hydraulic fluid supplied from the first hydraulic pump P1 via the passage 211 and the load passage WA. The joined flow rate is supplied to the bottom side of the actuator B, thereby increasing the speed of extension of the actuator B.

Further, similarly to the first embodiment, since the mutual independence between the first and second hydraulic pumps P1, P2 is ensured, the pressure loss in hydraulic pumps associated with the actuators on the side of the lower load pressure is reduced and the energy loss is reduced correspondingly. Also, heat generation in the pressure compensating devices is avoided, resulting in an improvement of heat balance. Additionally, a reduction in the pump delivery rate resulted from the input torque limiting control function of the pump regulators 41*a*, 41*b* is suppressed and working efficiency in the combined operation of plural actuators can be improved.

When only the spool 41 is moved to the left in FIG. 1 through a distance larger than the first predetermined distance S1, the hydraulic fluid supplied from the first hydraulic pump P1 is supplied to the rod side of the actuator B via the pump port 2, the first variable restrictor RB1, the passage 201, the first pressure compensating device VB1, the passage 211 and the load passage WB, thereby enabling the actuator B to be contracted.

Figure 3:
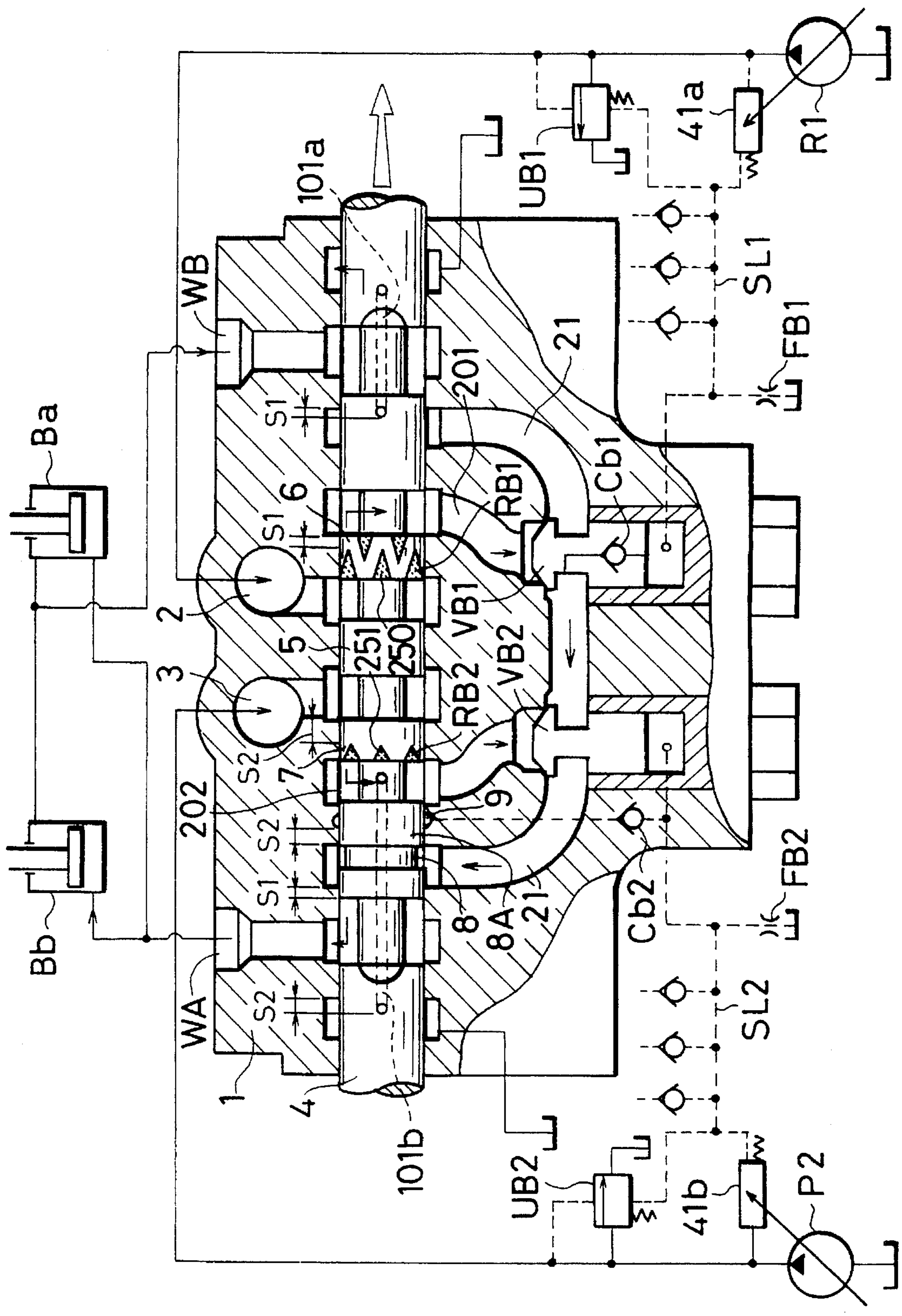
FIG. 3 is a diagram showing principal part of a hydraulic drive circuit according to a third embodiment of the present invention.

FIG. 3 shows a hydraulic drive system according to a third embodiment of the present invention. In this third embodiment, the two spools in the above second embodiment are replaced with a single spool to reduce the size and the production cost of a valve apparatus. Note that those members in FIG. 3 identical to those shown in FIG. 2 are denoted by the same reference numerals.

In the third embodiment shown in FIG. 3, two actuators Ba, Bb cooperating with each other are operated instead of the actuator B in FIG. 2, but these actuators Ba, Bb operate in a like manner to the actuator B. In this third embodiment, a single spool 4 is disposed in a valve body 1, the spool 4 being functionally divided by a land 5 into two parts. A first variable restrictor RB1 is provided on a land 6 of the spool 4, and a second variable restrictor RB2 is provided on a land 7 of the spool 4. The first variable restrictor RB1 is disposed between a pump port 2 and a passage 201, and the second variable restrictor RB2 is disposed between a pump port 3 and a passage 202. The first and second variable restrictors RB1, RB2 are set so that when the spool 4 has moved through a first predetermined distance S1, the first variable restrictor RB1 starts opening and when the spool 4 has moved to the right through a second predetermined distance S2 (>S1), the second variable restrictor RB2 also starts opening. The passage 201 downstream of the first variable restrictor RB1 and the passage 202 downstream of the second variable restrictor RB2 are connected to be communicated with a passage 21 which is capable of communicating with load passages WA, WB. A first pressure compensating device VB1 is disposed between the passage 201 and the passage 21, and a second pressure compensating device VB2 is disposed between the passage 202 and the passage 21.

The spool 4 is provided with a passage 101*a* capable of communicating with a reservoir to prevent a confined pressure from producing in the passage 21 during its movement from a neutral position to a position corresponding to the first predetermined distance S1, and also with a passage 101*b* capable of communicating with the reservoir to prevent a confined pressure from producing in the passage 202 during its movement from the neutral position to a position corresponding to the second predetermined distance S2. Further, a check valve cb1 for detecting a pressure on the outlet side of the first pressure compensating device VB1 is built in the first pressure compensating device VB1, and the valve body 1 is formed with a groove 9 in communication with a check valve cb2 for detecting a pressure on the outlet side of the second pressure compensating device VB2. The spool 4 is provided with a spool stem 8 positioned to face the groove 9 when the spool 4 has moved to the right through the second predetermined distance S2. A land 8A adjacent the spool stem 8 functions as an opening/closing portion which cuts off the communication between the outlet side of the second pressure compensating device VB2 and the groove 9 before the spool 4 has moved through the second predetermined distance S2, and establishes the communication therebetween through the spool stem 8 after the spool 4 has moved through the second predetermined distance S2.

In the above construction, the passage 21 corresponds to the line 300 of the coupling circuit in the first embodiment of FIG. 1, and the spool stem 8 and the land 8A constitute opening/closing means which is switched over from a closed position to an open position in response to a shift from sole operation of the first variable restrictor RB1 to combined operation of the first and second variable restrictors RB1, RB2. Additionally, in this embodiment, the land 7 serves as a part of the function of the opening/closing valve F in the first embodiment of FIG. 1.

The third embodiment thus constructed operates as follows.

In the neutral state as shown in FIG. 3, for example, a confined pressure possibly produced in a portion of the passage 21 located between the first pressure compensating device VB1 and the load passage WB can be removed through the passage 101*a* communicating with the reservoir. Also, the pressure in the passage 21 can be absorbed through a sliding clearance of the second pressure compensating device VB2 and a fixed restrictor FB2 in a maximum load pressure detecting line SL2. Further, a confined pressure possibly produced in the groove 9 communicated with the check valve cb2 can be absorbed through the check valve cb2 and the fixed restrictor FB2 in the maximum load pressure detecting line SL2.

When the spool 4 is moved to the right in FIG. 3, for example, to such an extent as being somewhat larger than the first predetermined distance S1 (but not reaching the second predetermined distance S2) in the above neutral state, the communication between the passage 21 and the reservoir via the passage 101*a* is cut off, the communication between the passage 21 and the groove 9 remains cut off, the communication between the passage 101*b* and the reservoir remains continued, the pump port 2 is communicated with the passage 201 via the first variable restrictor RB1, and further the passage 21 is communicated with the load passage WA. Accordingly, the hydraulic fluid from the first hydraulic pump P1 is supplied to both the actuators Ba, Bb via the pump port 2, the first variable restrictor RB1, the passage 201, the first pressure compensating device VB1, the passage 21 and the load passage WA, thereby driving the actuators Ba, Bb in a direction to extend. The load pressure of the actuators Ba, Bb is detected by the check valve cb1 and applied to the maximum load pressure detecting line SL1. Such a process is similar to that in the above second embodiment. Also, the combined operation of the actuators Ba, Bb and another notshown actuator associated with the first hydraulic pump P1 is performed in a like manner to the above second embodiment.

At this time, the second variable restrictor RB2 is closed and the pump port 3 is not communicated with the passage 202. Also, the passage 21 and the groove 9 are not communicated with each other, and the pressure detected by the check valve cb2 is a pressure in the groove 9, i.e., low one corresponding to the reservoir pressure. In this third embodiment, therefore, a signal pressure corresponding to the reservoir pressure is introduced to the second pump regulator 41*b*, whereby the second hydraulic pump P2 is controlled to deliver the hydraulic fluid at a pressure of about 15 atm. set by the unloading valve UB2, similarly to the above embodiment.

When the spool 4 is further moved to the right in FIG. 3 beyond the second predetermined distance S2 in the above condition that the spool has been moved to such an extent as being somewhat larger than the first predetermined distance S1, the above state remains continued on the side of the first hydraulic pump P1. On the side of the second hydraulic pump P2, however, the pump port 3 is communicated with the passage 202 via the second variable restrictor RB2, and the spool stem 8 is positioned to communicate the passage 21 and the groove 9. Accordingly, the hydraulic fluid supplied from the second hydraulic pump P2 via the pump port 3, the second variable restrictor RB2, the passage 202, the second pressure compensating device VB2, the passage 21 and the load passage WA is joined with the hydraulic fluid from the first hydraulic pump P1 and then supplied to both the actuators Ba, Bb, thereby increasing the speed of extension of the actuators Ba, Bb. At this time, the load pressure of the actuators Ba, Bb is applied to the maximum load pressure detecting line SL2 via the spool stem 8, the groove 9 and the check valve cb2. Such a process is also similar to that in the above second embodiment.

Further, in the third embodiment thus constructed, since the mutual independence between the two hydraulic pumps P1, P2 is ensured, the advantages similarly to those in the first embodiment can be achieved in, for example, controlling the hydraulic pumps P1, P2 to deliver the hydraulic fluid at the predetermined lowest pressure and minimizing the energy loss. Additionally, since this third embodiment employs the single spool 4 as explained above, the number of members to be built in the valve body 1 is reduced and the space occupied by the members built in the valve body 1 is also reduced, making it possible to realize a reduction in size of the valve apparatus incorporating the valve body 1 and the production cost thereof.

Figure 4:
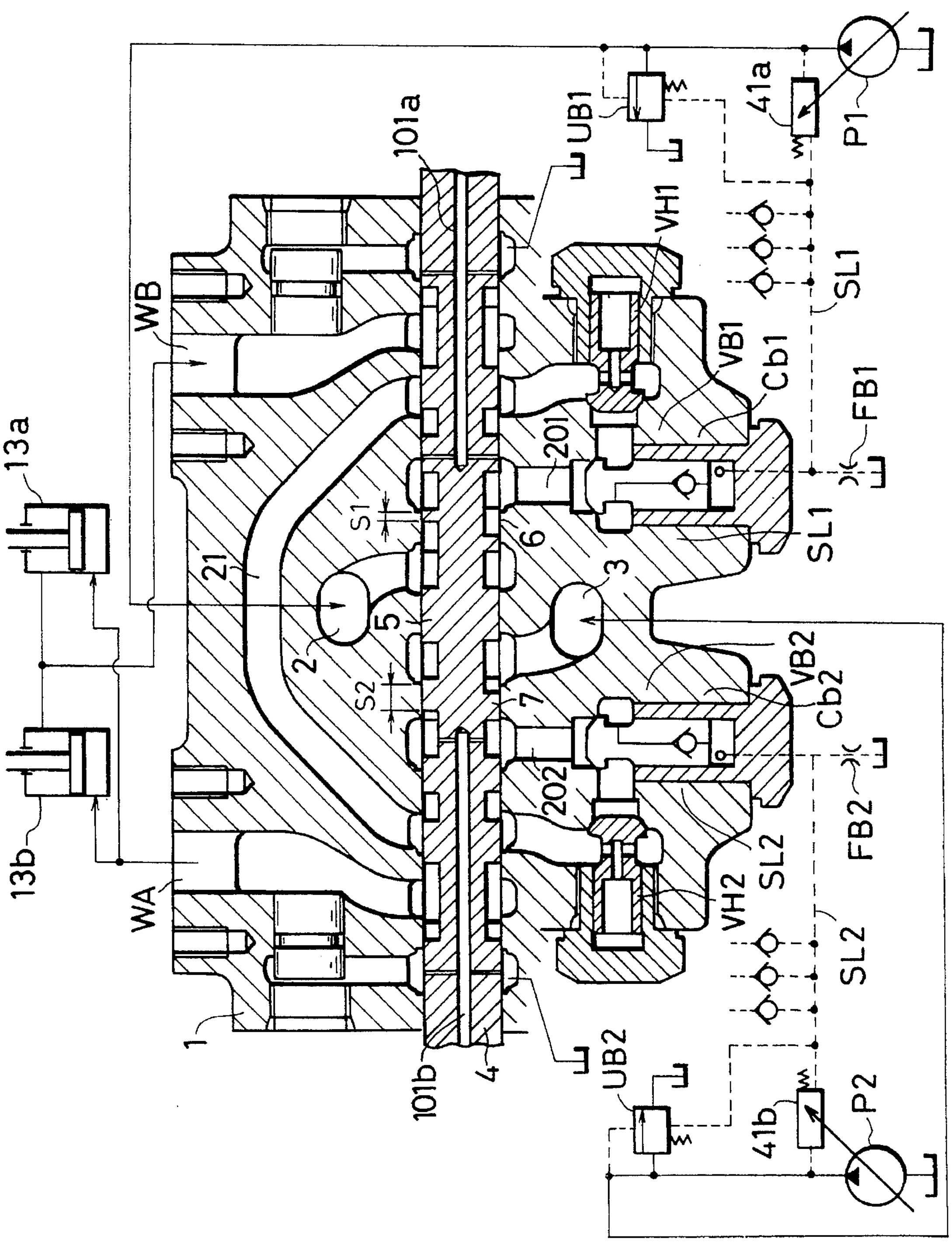
FIG. 4 is a diagram showing principal part of a hydraulic drive circuit according to a fourth embodiment of the present invention.

FIG. 4 shows a hydraulic drive system according to a fourth embodiment of the present invention. In this fourth embodiment, a single spool 4 is disposed in a valve body 1 as with the above third embodiment.

In the fourth embodiment shown in FIG. 4, a check valve cb1 for detecting a load pressure of an actuator in the associated location is provided in a first pressure compensating device VB1, and a check valve cb2 for detecting a load pressure of the actuator in the associated location is provided in a second pressure compensating device VB2. Further, in portions of a passage 21 respectively communicating with load passages WA, WB at positions downstream of the first and second pressure compensating devices VB1, VB2, there are provided check means for preventing a load holding pressure in the neutral state from being transmitted to first and second pump regulators 41*a*, 41*b*, i.e., hold check valves VH1, VH2 for completely preventing erroneous operation of detecting the load pressure due to a leak or the like.

In this fourth embodiment, the form of the passage 21 and the arrangement of pump ports 2, 3 are different from those in the above third embodiment, but their functions are practically the same as those in the third embodiment.

The fourth embodiment thus constructed can also provide the similar advantages to those in the third embodiment. Particularly, the hold check valves VH1, VH2 eliminate an influence of a leak being possibly produced in the passage 21 upon the load pressure detecting operation and enables a highly accurate load pressure detecting operation to be performed. It is thus possible to high-accurately carry out pressure control by the first and second pressure compensating devices VB1, VB2 and delivery rate control by the first and second pump regulators 41*a*, 41*b*.

FIG. 5 shows a hydraulic drive system according to a fifth embodiment of the present invention. In this fifth embodiment, a circuit for driving another actuator is added to the construction of the above third embodiment of FIG. 3. In other words, this fifth embodiment includes another circuit for driving an actuator A along with the circuit for driving the actuators Ba, Bb.

A spool 4*a* disposed in a valve body 1*a* of a valve apparatus for controlling the driving of the actuator A is formed in the same configuration as the spool 4 disposed in the valve body 1 of the valve apparatus for controlling the driving of the actuators Ba, Bb, but arranged in a direction opposite to the spool 4. Therefore, a variable restrictor RB1*a* disposed between a pump port 2*a* in communication with the delivery line of the first hydraulic pump P1 and a passage 202*a* has the same configuration as the second variable restrictor RB2 formed around the spool 4, and a variable restrictor RB2*a* disposed between a pump port 3*a* in communication with the delivery line of the second hydraulic pump P2 and a passage 201*a* has the same configuration as the first variable restrictor RB1 formed around the spool 4. Also, a pressure compensating device VB1*a* disposed between the passage 202*a* and a passage 21*a* capable of communicating with a load passage WAa has the same configuration as the second pressure compensating device VB2 in the valve body 1, and a pressure compensating device VB2*a* disposed between the passage 201*a* and the passage 21*a* capable of communicating with a load passage WBa has the same configuration as the first pressure compensating device VB1 in the valve body 1. Denoted by cb2*a* is a check valve for detecting a load pressure of the actuator A on the outlet side of the pressure compensating device VB2*a* and applying it to the maximum load pressure detecting line SL2, and cb1*a* is a check valve for detecting a load pressure of the actuator A on the outlet side of the pressure compensating device VB1*a* and applying it to the maximum load pressure detecting line SL1. 101*aa*, 101*ba* are passages identical to the passages 101*a*, 101*b* provided in the spool 4 and being capable of communicating with the reservoir.

In this fifth embodiment, the sole operation of the actuators Ba, Bb at a low speed and the sole operation thereof at an increased speed resulted from joining of the hydraulic fluids from the hydraulic pumps P1, P2, as well as the sole operation of the actuator A at a low speed and the sole operation thereof at an increased speed resulted from joining of the hydraulic fluids from the hydraulic pumps P1, P2 are carried out in a like manner to the above third embodiment.

The combined operation of the actuators Ba, Bb and the actuator A can be performed by moving the spool 4 in the valve body 1 to the right through a distance over the first predetermined distance S1 but not reaching the second predetermined distance S2, and also moving the spool 4*a* in the valve body 1*a* to the left through a distance over the first predetermined distance S1 but not reaching the second predetermined distance S2. In this case, with the movement of the spool 4 in the valve body 1 to the right, the first variable restrictor RB1 is opened and the second variable restrictor RB2 is kept closed, whereby the hydraulic fluid from the first hydraulic pump P1 is supplied to the actuators Ba, Bb via the pump port 2, the first variable restrictor RB1, the passage 201, the first pressure compensating device VB1, the passage 21 and the load passage WA. Also, with the movement of the spool 4*a* in the valve body 1*a* to the left, the variable restrictor RB2*a* is opened and the variable restrictor RB1*a* is kept closed, whereby the hydraulic fluid from the second hydraulic pump P2 is supplied to the actuator A via the pump port 3, the variable restrictor RB2*a*, the passage 201*a*, the pressure compensating device VB2*a*, the passage 21*a* and the load passage WAa. As a result, the combined operation of the actuators Ba, Bb and the actuator A can be achieved without causing interference between their load pressures. In other words, by operating the spools 4, 4*a* as mentioned above, mutual independence between the hydraulic pumps P1 and P2 can be ensured.

It is a matter of course that while hydraulic cylinders are used as the actuators A, B, Ba, Bb, C in the above embodiments, there can also be obtained similar operating advantages even when hydraulic motors or the like are used instead.

If the hydraulic drive system of the present invention is equipped on a civil engineering and construction machine such as a hydraulic excavator, for example, which has a traveling body provided with crawler belts, the actuators may be two travel motors for driving the crawler belts. In this case, by forming a circuit such that the hydraulic fluids delivered from the two hydraulic pumps P1, P2 are always joined with each other and then supplied to one or both of the travel motors, superior working efficiency can be obtained without a zigzag motion during travel, even when the hydraulic fluids from the two hydraulic pumps P1, P2 are distributed to not only the travel motors, but also the boom cylinder and/or the arm cylinder during combined operation of travel and other kinds of work implemented by other equipment such as a boom and an arm.

INDUSTRIAL APPLICABILITY

According to the present invention constructed as set forth above, in a hydraulic drive system of the type driving delivery rate control means using a load pressure of an actuator as a signal pressure, mutual independence between two variable displacement hydraulic pumps can be ensured. Consequently, the present hydraulic drive system is advantageous in that the energy loss can be suppressed and the system is more economical in comparison with the prior art, and the kinds of work practically achieved by operation of plural actuators can be increased and improved working efficiency results.

We claim:

1. A hydraulic drive system, comprising first and second variable displacement hydraulic pumps (P1, P2), a first hydraulic actuator (B) driven by hydraulic fluids delivered from said first and second hydraulic pumps (P1, P2), a second hydraulic actuator (C) driven by the hydraulic fluid delivered from said second hydraulic pump, first variable restrictor means (RB1) for controlling a flow rate of the hydraulic fluid supplied from said first hydraulic pump to said first hydraulic actuator, second variable restrictor means (RB2) for controlling a flow rate of the hydraulic fluid supplied from said second hydraulic pump to said first hydraulic actuator, third variable restrictor means (RC) for controlling a flow rate of the hydraulic fluid supplied from said second hydraulic pump to said second hydraulic actuator, a first pressure compensating device (VB1) for controlling a differential pressure across said first variable restrictor means, a second pressure compensating device (VB2) for controlling a differential pressure across said second variable restrictor means, a third pressure compensating device (VC) for controlling a differential pressure across said third variable restrictor means, first delivery rate control means (41*a*) for controlling a delivery rate of said first hydraulic pump, second delivery rate control means (41*b*) for controlling a delivery rate of said second hydraulic pump, and a coupling circuit (300) for joining the flow rate passing through said first variable restrictor means and the flow rate passing through said second variable restrictor means with each other and supplying the joined flow rate to said first hydraulic actuator, wherein said system further comprises:

first sensor means (cb1) for detecting a pressure on an outlet side of said first pressure compensating device, second sensor means (cb2) for detecting a pressure on an outlet side of said second pressure compensating device;

third sensor means (cc) for detecting a pressure on an outlet side of said third pressure compensating device;

first signal pressure supply means (SL1) for supplying the pressure detected by said first sensor means, as a first signal pressure, to said first delivery rate control means;

second signal pressure supply means (SL2) operated independently of said first signal pressure supply means for selecting a higher one of the pressure detected by said second sensor means and the pressure detected by said third sensor means, and supplying the selected higher pressure as a second signal pressure to said second delivery rate control means; and opening/closing means disposed in said coupling circuit and switched over from a closed position to an open position in response to a shift from a sole operation of said first variable restrictor means (RB1) to a combined operation of said first and second variable restrictor means (RB1, RB2);

wherein an operating relationship between said first and second variable restrictor means (VB1, VB2) is set such that when a demanded flow rate of said first hydraulic actuator (B) is small, said first variable restrictor means is solely operated to supply only the hydraulic fluid from said first hydraulic pump (P1) to said first hydraulic actuator and when the demanded flow rate of said first hydraulic actuator is increased to exceed a predetermined value, said first and second variable restrictor means are both operated to supply both the hydraulic fluids from said first and second hydraulic pumps (P1, P2) to said first hydraulic actuator.

2. A hydraulic drive system according to claim 1, further comprising a third hydraulic actuator (A) driven by the hydraulic fluid delivered from said first hydraulic pump (P1), fourth variable restrictor means (RA) for controlling a flow rate of the hydraulic fluid supplied from said first hydraulic pump to said third hydraulic actuator, a fourth pressure compensating device (VA) for controlling a differential pressure across said fourth variable restrictor means, and fourth sensor means (ca) for detecting an outlet pressure of said fourth pressure compensating device (VA), wherein said first signal pressure supply means (SL1) selects a higher one of the pressure detected by said first sensor means (cb1) and the pressure detected by said fourth sensor means (ca), and supplies the selected higher pressure as said first signal pressure to said first delivery rate control means (41*a*).

3. A hydraulic drive system, comprising first and second variable displacement hydraulic pumps (P1, P2), a first hydraulic actuator (B) driven by hydraulic fluids delivered from said first and second hydraulic pumps (P1, P2), a second hydraulic actuator (C) driven by the hydraulic fluid delivered from said second hydraulic pump, first variable restrictor means (RB1) for controlling a flow rate of the hydraulic fluid supplied from said first hydraulic pump to said first hydraulic actuator, second variable restrictor means (RB2) for controlling a flow rate of the hydraulic fluid supplied from said second hydraulic pump to said first hydraulic actuator, third variable restrictor means (RC) for controlling a flow rate of the hydraulic fluid supplied from said second hydraulic pump to said second hydraulic actuator, a first pressure compensating device (VB1) for controlling a differential pressure across said first variable restrictor means, a second pressure compensating device (VB2) for controlling a differential pressure across said second variable restrictor means, a third pressure compensating device (VC) for controlling a differential pressure across said third variable restrictor means, firs delivery rate control means (41*a*) for controlling a delivery rate of said first hydraulic pump, second delivery rate control means (41*b*) for controlling a delivery rate of said second hydraulic pump, and a coupling circuit (300) for joining the flow rate passing through said first variable restrictor means and the flow rate passing through said second variable restrictor means with each other and supplying the joined flow rate to said first hydraulic actuator, wherein said system further comprises:

first sensor means (cb1) for detecting a pressure on an outlet side of said first pressure compensating device, second sensor means (cb2) for detecting a pressure on an outlet side of said second pressure compensating device;

third sensor means (cc) for detecting a pressure on an outlet side of said third pressure compensating device;

first signal pressure supply means (SL1) for supplying the pressure detected by said first sensor means, as a first signal pressure, to said first delivery rate control means;

second signal pressure supply means (SL2) operated independently of said first signal pressure supply means for selecting a higher one of the pressure detected by said second sensor means and the pressure detected by said third sensor means, and supplying the selected higher pressure as a second signal pressure to said second delivery rate control means; and wherein said first and second variable restrictor means (RB1, RB2) include notches formed in first and second spools, respectively positional relationship between said notches of said first and second variable restrictor means being set such that when said first and second spools have moved through a first predetermined distance (S1), said notch of said first variable restrictor means is first opened and when said first and second spools have moved through a second predetermined distance (S2) larger than said first predetermined distance, said notch of said second variable restrictor means is then opened;

wherein said second spool is further formed with an opening/-closing portion for closing said coupling circuit before said second spool has moved through said second predetermined distance (S2), and opening said coupling circuit when said second spool has moved through said second predetermined distance (S2).

4. A hydraulic drive system according to claim 3, wherein said first and second spools are separate spools (41, 42) arranged parallel to each other.

5. A hydraulic drive system according to claim 3, wherein said first and second spools are arranged coaxially to each other in the form of a one-piece spool (4).

* * * * *